(12) United States Patent
Hiramine (10) Patent No.: US 8,836,477 B2
(45) Date of Patent: Sep. 16, 2014

(54) PORTABLE COMMUNICATION MACHINE AND VEHICULAR COMMUNICATION SYSTEM USING THE SAME

(75) Inventor: Masanobu Hiramine, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1350 days.

(21) Appl. No.: 12/062,971

(22) Filed: Apr. 4, 2008

(65) Prior Publication Data

US 2008/0246586 A1 Oct. 9, 2008

(30) Foreign Application Priority Data

Apr. 6, 2007 (JP) ................................. 2007-100524

(51) Int. Cl.
| | | |
|---|---|---|
| G05B 19/00 | (2006.01) | |
| G08C 17/02 | (2006.01) | |
| B60R 25/24 | (2013.01) | |
| G07C 9/00 | (2006.01) | |

(52) U.S. Cl.
CPC ........... *G08C 17/02* (2013.01); *B60R 2325/205* (2013.01); *G07C 2009/00793* (2013.01); *G07C 9/00309* (2013.01); *B60R 2325/101* (2013.01); *B60R 25/24* (2013.01)
USPC ....... 340/5.72; 307/10.1; 307/10.2; 455/41.2; 370/401; 370/402; 180/287; 340/426.36; 340/5.2

(58) Field of Classification Search
CPC ................. G07C 9/00309; G07C 2009/00793; G07C 2209/63; G07C 9/00103; G07C 9/00182; B60R 25/24; B60R 25/04; B60R 25/1003; B60R 25/042; B60R 25/08; B60R 25/045; B60R 25/1018; H04L 29/06; H04L 45/00; H04L 29/06027; H04L 12/66; H04L 47/10; H04L 12/4625; H04L 49/351; H04L 12/46; H04L 12/4604

USPC ........... 340/5.72, 426.36, 5.2; 307/10.1, 10.2; 455/41.2; 370/401, 402; 180/287
See application file for complete search history.

(56) References Cited

U.S. PATENT DOCUMENTS

| | | | |
|---|---|---|---|
| 6,323,566 B1 * | 11/2001 | Meier .......................... | 307/10.2 |
| 2003/0001723 A1 | 1/2003 | Masudaya | |
| 2003/0222756 A1 | 12/2003 | Shimonomoto et al. | |
| 2004/0184466 A1 * | 9/2004 | Chang et al. .................. | 370/401 |
| 2005/0219036 A1 | 10/2005 | Ueda et al. | |

(Continued)

FOREIGN PATENT DOCUMENTS

| | | |
|---|---|---|
| DE | 19827586 A1 | 12/1999 |
| DE | 10323202 A1 | 12/2003 |

(Continued)

OTHER PUBLICATIONS

German Office Action Dated Nov. 5, 2013 issued in corresponding German Patent Application No. 10 2008 017 184.0.

*Primary Examiner* — Omer S Khan
(74) *Attorney, Agent, or Firm* — Sughrue Mion, PLLC (57) ABSTRACT

A portable communication machine includes RF data generating means, RF wireless transmitting means for transmitting transmission data as an RF signal, RF wireless receiving means for receiving an RF signal transmitted from a vehicle-mounted machine, RF data analyzing means for analyzing received data, key operating means for instructing to control a vehicle by a user, storing means for storing control data of a vehicle-mounted information apparatus, attachable/detachable external apparatus communicating means, and controlling means for controlling the RF data generating means, the RF data analyzing means, the key operating means and the external apparatus communicating means, and is used along with an external apparatus and the vehicle-mounted information apparatus.

18 Claims, 3 Drawing Sheets

(56) References Cited

U.S. PATENT DOCUMENTS

| | | |
|---|---|---|
| 2006/0199539 A1* | 9/2006 | Yang et al. .................... 455/41.2 |
| 2007/0060056 A1* | 3/2007 | Whitaker et al. ............. 455/41.2 |
| 2007/0124614 A1* | 5/2007 | Lee et al. ....................... 713/300 |
| 2008/0048846 A1 | 2/2008 | Nagai et al. |

FOREIGN PATENT DOCUMENTS

| | | |
|---|---|---|
| DE | 102005015403 B4 | 2/2006 |
| DE | 102007037491 A1 | 3/2008 |
| EP | 1271420 B1 | 6/2002 |
| JP | 01-192970 A | 8/1989 |
| JP | 08-234524 A | 9/1996 |
| JP | 10-176448 A | 6/1998 |
| JP | 2000-266563 A | 9/2000 |
| JP | 2001-193324 A | 7/2001 |
| JP | 2002-115438 A | 4/2002 |
| JP | 2004-108016 A | 4/2004 |
| JP | 2005-297819 A | 10/2005 |

* cited by examiner

PORTABLE COMMUNICATION MACHINE AND VEHICULAR COMMUNICATION SYSTEM USING THE SAME

BACKGROUND OF THE INVENTION

1. Field of the Invention

The present invention relates to a portable communication machine and a vehicular communication system using the same preferable when it is intended to remotely operate to unlock or lock a vehicular door, or start an engine, operate a vehicle-mounted information apparatus, or confirm or monitor a vehicular state.

2. Description of the Related Art

In a related art, as a vehicular communication system for promoting a convenience of an automobile, there is known a keyless entry system in which a vehicular door is remotely unlocked or locked with a wireless signal such as an infrared ray transmitted by way of an operating switch of a portable communication machine as described in, for example, Patent Reference 1. According to the keyless entry system, the portable communication machine transmits a signal including an identification data for identifying the portable communication machine and the signal is received and checked by a vehicle-mounted machine to unlock or lock a door of a vehicle.

Further, in order to promote the convenience, as described in Patent Reference 2, there is also known a keyless entry system in which communication of identification data and a signal processing between a vehicle-mounted machine and a portable communication machine is automatically carried out by operating a switch provided on a side of a vehicle door instead of a switching operation by a user carrying a portable communication machine by taking out the portable communication machine from, for example, a bag. According to the keyless entry system, the vehicle-mounted machine transmits a request signal by an LF signal to the portable communication machine. The portable communication machine is awakened from a standby state when the request signal is received and transmits a signal including the identification data. The vehicle-mounted machine receives and checks the signal and unlocks or locks the door of the vehicle.

Further, in recent years, there is also proposed a keyless entry system utilizing a portable terminal of a portable telephone or PDA which has been spread remarkably. When a portable telephone or PDA is carried to utilize as a portable communication machine for an automobile, it is not necessary to carry a key of an automobile, which is convenient. As such a keyless entry system, there are, for example, Patent References 3 through 5. Among the References, communication media between a portable telephone and a vehicle-mounted machine respectively differ from each other, according to Patent Reference 3, in communicating a vehicle-mounted machine and a portable telephone, the communication is carried out by way of a public network. According to Patent Reference 4, communication is carried out by utilizing a weak radio wave of a frequency band of a portable telephone or a radio wave by Bluetooth standards. According to Patent Reference 5, in communicating between a portable machine of PDA or the like and a vehicle-mounted machine, communication is carried out by utilizing the radio wave by Bluetooth standards.

As other vehicular communication system, there is known a vehicular information confirming system for confirming vehicular information including security of a vehicle disposed remotely from a user by displaying the vehicular information by a portable communication machine. For example, according to Patent Reference 6, a vehicle-mounted machine receiving a request signal from a portable communication machine transmits vehicular information of a state of door lock or brake, a vehicular position image or the like to the portable communication machine wherein the signal is displayed.

Also in the vehicular information confirming system, similar to the keyless entry system, there is proposed a vehicular information confirming system utilizing a portable telephone as a portable communication machine. For example, according to Patent Reference 7, vehicular information is transmitted and received by way of wireless communication of Bluetooth standards. By utilizing a portable telephone, a user interface such as a highly chromatic display device mounted to the portable telephone as standard specification, and inputting means can be utilized and the convenience can be promoted by changing a software.

Further, in recent years, a vehicle mounted with an information apparatus of a car navigation apparatus or the like is increasing, and there is proposed a system of utilizing a portable communication machine of a keyless entry system for setting a destination or the like. For example, according to Patent Reference 8, by forming control data for setting a destination for a car navigation apparatus by a personal computer and transmitting the control data to the car navigation apparatus by way of a portable communication machine and receiving means of a vehicle-mounted machine in keyless entry, an operation of setting a destination is simplified and convenience is promoted.

Patent Reference 1: JP-A-1-192970
Patent Reference 2: JP-A-10-176448
Patent Reference 3: JP-A-8-234524
Patent Reference 4: JP-A-2001-193324
Patent Reference 5: JP-A-2002-115438
Patent Reference 6: JP-A-2000-266563
Patent Reference 7: JP-A-2005-297819
Patent Reference 8: JP-A-2004-108016

However, according to the keyless entry system of the related art described in Patent References 1 and 2, and the vehicular information confirming system of the related art described in Patent Reference 6, despite the constitution having a similar wireless portion, an operation switch or display means on a vehicle cannot be made common, and there is an inconvenience that a user requesting both of a keyless entry function and a vehicular information confirming function carries respective exclusive portable communication machines. Further, when the portable communication machine of the keyless entry system of the related art and the portable communication machine of the vehicular information confirming system of the related art are unified, a problem of enlarging the portable communication machine is posed and it is difficult to promote the convenience for the user mainly using a keyless entry system.

On the other hand, according to a communication system utilizing a portable terminal of a portable telephone or PDA as a portable communication machine as in the keyless entry system of the related art described in Patent References 3, 4, and 5 and the vehicular information confirming system of the related art described in Patent Reference 7, there is a possibility of capable of unifying respective exclusive portable communication machines of a keyless entry system and a vehicular information confirming system to a portable terminal. However, according to a portable terminal of a portable telephone or the like, in comparison with an exclusive portable communication machine, consumption of a battery is considerable. Particularly, it is requested for a portable communication machine of keyless entry to operate for about one year to two years in normal operating state without interchanging the battery. According to the portable terminal, consumption of a battery is considerable by a situation of using other than a keyless entry function or the vehicular information confirming function to pose a problem that the battery needs to be charged frequently.

Further, all users do not necessarily hold a portable terminal, for example, when a key is intended to deposit to a third party of a family member or an acquaintance or the like, there poses a problem that the portable terminal per se needs to be provided, further, there poses a problem in convenience such that a size of a portable terminal is larger than that of an exclusive portable communication machine, a way of use is more excellent in an exclusive portable communication machine in simply controlling to lock a door.

Further, according to a system of utilizing a portable terminal described in Patent References 3, 4, 5, and 7, it is necessary to match communication systems of a portable terminal and a vehicle-mounted machine to pose a problem that selection of a portable terminal is restricted, or a vehicle-mounted machine needs to be interchanged in conformity with a communication system of a portable terminal.

Further, although according to Patent Reference 8, operation of a vehicle-mounted information apparatus is made to be simple and convenient by utilizing a keyless entry system, wireless communication means of a portable communication machine is limited to a communication system of infrared ray or the like common to a personal computer and a vehicle-mounted machine, and therefore, it is difficult to deal with a radio wave system currently used generally, and a premise is constituted by utilizing receiving means of a vehicle-mounted machine, and therefore, there poses a problem that a special harness is needed for communicating the vehicle-mounted machine and an information apparatus.

SUMMARY OF THE INVENTION

The invention has been carried out in consideration of the above-described situation and it is a main object thereof to provide a portable communication machine and a vehicular communication system realizing a portability, an operability, and a maintenance performance suitable for any of a keyless entry system and a vehicular information confirming system and a vehicle-mounted information apparatus control assisting system.

According to a first mode of the invention for achieving the object, there is provided a portable communication machine including RF data generating means for generating a transmission data to a vehicle-mounted machine provided to a vehicle constituting an object of control by using a previously registered inherent identification data and a control data of the vehicle, RF wireless transmitting means for transmitting the data generated by the RF data generating means as an RF signal, RF wireless receiving means for receiving the RF signal transmitted from the vehicle-mounted machine, RF data analyzing means for analyzing the data outputted by the RF wireless receiving means, key operating means for instructing to control the vehicle by a user, storing means for storing a control data with regard to a vehicle-mounted information apparatus of the vehicle of the control object, and controlling means for controlling the RF data generating means, the RF data analyzing means, the key operating means and the storing means, further including external apparatus communicating means having an interface for transmitting and receiving a communication data between an external apparatus and the portable communication machine.

According to a second mode of the invention for achieving the object, there is provided a vehicular communication system which is constituted by a portable communication machine including RF data generating means for generating a transmission data to a vehicle-mounted machine provided at a vehicle constituting an object of control by using a previously registered inherent identification data and a control data of the vehicle, RF wireless transmitting means for transmitting the data generated by the RF data generating means as an RF signal (radiating electromagnetic wave), RF wireless receiving means for receiving the RF signal transmitted from the vehicle-mounted machine, RF data analyzing means for analyzing the data received by the RF wireless receiving means, key operating means for instructing to control the vehicle by a user, storing means for storing a control data with regard to a vehicle-mounted information apparatus of the vehicle constituting the control object, controlling means for controlling the RF data generating means, the RF data analyzing means, the key operating means and the storing means, and external apparatus communicating means having an interface for transmitting and receiving a data between an external apparatus and the portable communication machine, and the external apparatus communicating with the portable communication machine by way of the external apparatus communicating means, wherein the external apparatus includes user input processing means for inputting a control instruction to the vehicle and data displaying means for displaying a receiving data received from the vehicle-mounted machine.

According to the invention, there can be provided a portable communication machine and a vehicular communication system for realizing a portability, an operability, and a maintenance performance suitable for any of a keyless entry system and a vehicular information confirming system and a vehicular information apparatus control assisting system.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENT

Embodiment 1

Figure 1:
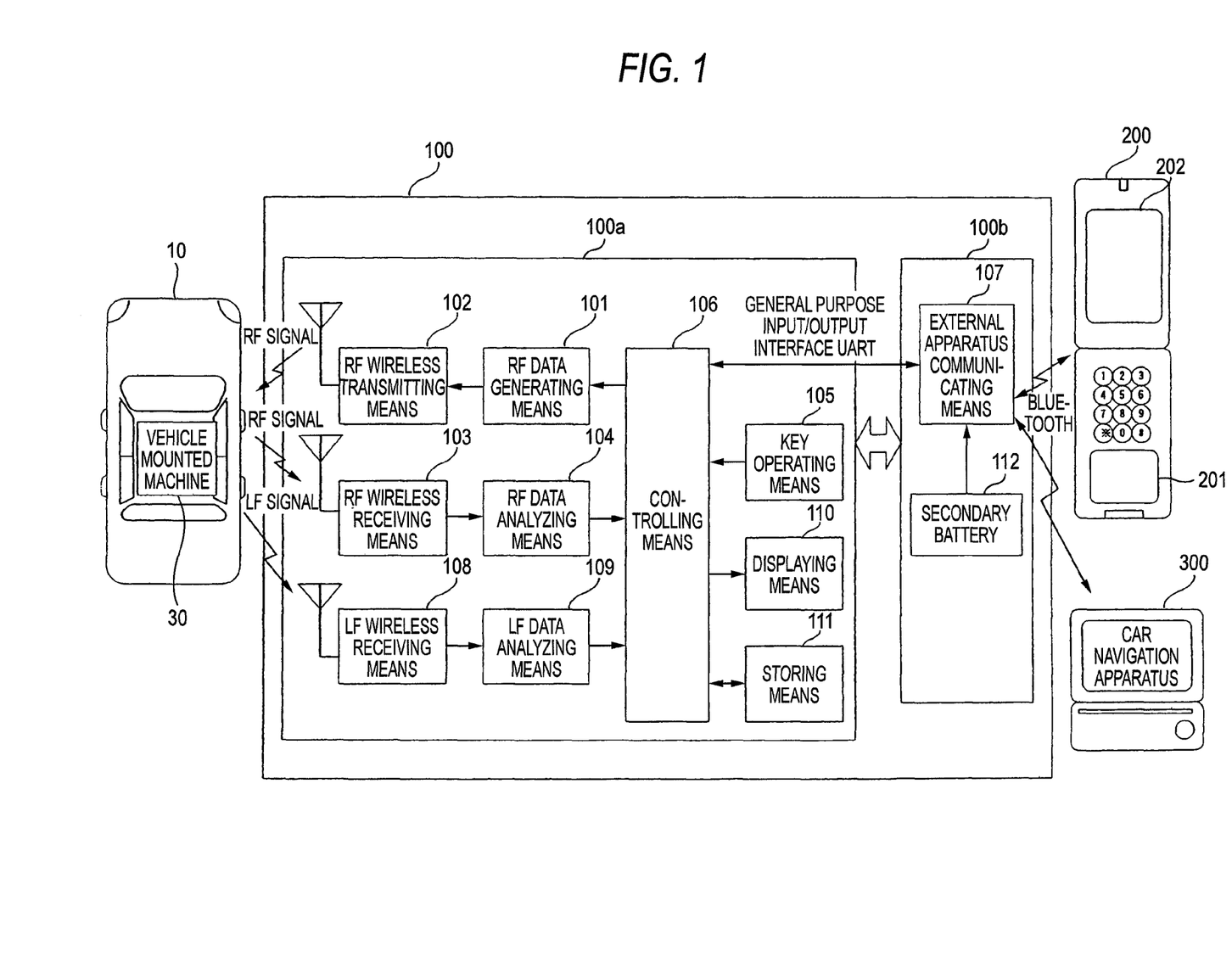
FIG. 1 is a block diagram showing a constitution of a portable communication machine and a vehicular communication system according to Embodiment 1 of the invention.

FIG. 1 shows a block diagram showing an inner constitution of a portable communication machine 100 according to Embodiment 1 of the invention and a vehicular communication system using the same. The portable communication machine 100 is constituted by a portable communication portion 100a comprising RF data generating means 101, wireless transmitting means 102, RF wireless receiving means 103, RF data analyzing means 104, key operating means 105, controlling means 106, LF wireless receiving means 108, LF data analyzing means 109, displaying means 110 and storing means 111, and an external communication portion 100b comprising external apparatus communicating means 107 and a second battery 112.

The RF data generating means 101 generates a transmission data transmitted from the portable communication machine 100 to a vehicle-mounted machine 30 of a control object vehicle 10 as an RF signal by control of the controlling means 106. The transmission data is constituted by adding an identification code for identifying the portable communication machine 100 to a control data indicating a control content. Further, the RF data generating means 101 generates the transmission data by coding the data and preferably adding a codification for correcting an error to be outputted to the wireless transmitting means 102. Further, when a communication system of spread spectrum is carried out, the RF data generating means 101 carries out a spreading processing by a spread code for RF transmission.

The RF wireless transmitting means 102 modulates the transmission data inputted from the RF data generating means 101 to transmit from an antenna. For example, the transmission data is transmitted as a radiating electromagnetic wave of about 300 MHz. In the following explanation, the radiating electromagnetic wave is expressed as an RF signal. As a modulation system, various systems can be adopted, for example, an amplitude modulation system, a frequency modulation system, a phase modulation system or other system will do.

The RF wireless receiving means 103 demodulates the RF signal transmitted by the control object vehicle and received by the antenna. For example, a radio wave of several hundreds MHz, preferably, about 300 MHz is received. When the data outputted by the RF wireless receiving means 103 is constituted by spectrum spread, the RF data analyzing means 104 carries out inverse spread by using an RF receiving spread code. Thereafter, an identification data and a control data are extracted by decoding the code to output to the controlling means 106.

The LF wireless receiving means 108 demodulates an LF radio wave transmitted by the control object vehicle 10 and received by the antenna. For example, the LF radio wave forms a communication area at an entire region of inside of the vehicle and a vicinity of outside of the vehicle by a frequency of about several hundreds KHz and when the portable communication machine 100 is present in the area, the LF wireless receiving means 108 normally demodulates the LF radio wave. Preferably, it is designed to awaken from a standby state of low power consumption to a normal operating state when the LF signal is received.

The LF data analyzing means 109 extracts the identification data and the control data by decoding the demodulated LF signal. When the data outputted by the LF wireless receiving means 108 is constituted by spectrum spread, inverse spread is carried out by using an LF receiving spread code. Thereafter, the data is extracted by decoding the code to output to the controlling means 106. The key operating means 105 is a user interface by which a user instructs to control the vehicle, detects that a switch (not illustrated) arranged at the portable communication machine 100 is operated and informs a state of operating the switch to the controlling means 106.

The displaying means 110 is controlled by the controlling means 106 and displays a communication state and a received data content based on a result of operating to control the vehicle, that is, the data outputted by the RF data analyzing means 104 or the LF data analyzing means 109. Further, the displaying means 110 displays a content of operating the key operating means 105 (operation menu). In providing the displaying means 110, for example, LED will do, however, it is preferable to display control information of a control result or the like by a character or a picture by a liquid crystal display.

On the other hand, the external apparatus communicating means 107 constitutes a communication interface for transmitting and receiving data directly between various external apparatus 200 or a vehicle-mounted information apparatus 300 and the external apparatus communicating means, data is communicated between an external apparatus (portable telephone) and the external apparatus communicating means by communication by, for example, Bluetooth communication standards. Other than the Bluetooth communication, UART (Universal Asynchronous Receiver Transmitter), USB (Universal Serial Bus) standards, infrared ray communication, or portable telephone I/F will do, for example, further, communication may be realized by other communication system provided to the external apparatus. The external apparatus communicating means 107 is mounted with a general purpose interface between the external apparatus communicating means 107 and the portable communication portion 100a, and is constituted by an attachable/detachable structure capable of being easily divided therefrom and coupled thereto by constituting a boundary thereby as described later.

Further, although communication is realized by serial communication in conformity with UART between the external apparatus communicating means 107 and the controlling means 106 on a main body side of the portable communication machine 100, other communication system will do.

The storing means 111 is for storing a control data with regard to the vehicle-mounted information apparatus, for example, when the vehicle-mounted information apparatus 300 is a car navigation apparatus, the control data is a destination or route information. The control data is formed by an external apparatus of, for example, a personal computer, a portable telephone or the like and is received by the external apparatus communicating means 107. The storing means 111 can temporarily store vehicle information received by the RF wireless receiving means 103 and take out the vehicle information therefrom when needed. Further, the storing means 111 is used also when vehicle information outputted by the RF data analyzing means 104 is temporarily stored. The stored data is transmitted to the external apparatus 200 by way of the external apparatus communicating means 107 based on an input request from the external apparatus 200.

The controlling means 106 is connected to the RF data generating means 101, the RF data analyzing means 104, the key operating means 105, the displaying means 110, the storing means 111, and the external apparatus communicating means 107 and controls flows of signals. For example, the controlling means 106 detects an operation of the key operating means 105, and instructs the RF data generating means 101 to generate and transmit data transmitted to the vehicle-mounted machine 30 mounted to the vehicle 10 constituting the control object. Further, the controlling means 106 instructs the RF data analyzing means 104 to carry out a demodulating processing of data received by the RF wireless receiving means 103.

Further, the controlling means 106 informs the user by utilizing the displaying means 110 in accordance with a content of data outputted by the RF data analyzing means 104 and the LF data analyzing means 109. Further, when data received by the external apparatus communicating means 107 is an instruction of controlling the vehicle in correspondence with a request from the external apparatus 200, the controlling means 106 instructs the RF data generating means 101 to generate and transmit data in correspondence with the control instruction. On the other hand, when data received by the external apparatus communicating means 107 is a data of controlling the vehicle-mounted information apparatus, the data is stored to the storing means 111. Further, the controlling means 106 also instructs to transmit the control data stored to the storing means 111 to the external apparatus 200 by way of the external apparatus communicating means 107.

The second battery 112 is for supplying power to the external apparatus communicating means 107, may be a disposable type battery, or may be a charge type battery.

In the external apparatus 200, user input processing means 201 detects that a key arranged at the external apparatus 200 is operated and transmits data related to a key operation to the portable communication machine 100. Further, data displaying means 202 displays content of data received from the portable communication machine 100. Although according to the embodiment, the external apparatus 200 is constituted by a portable telephone, the external apparatus 200 may be provided with the user input processing means 201 and the data displaying means 202 and can be realized by, for example, PDA or a personal computer.

In this way, according to the embodiment, with regard to a basic control having a high frequency of use such as locking and unlocking a door, the vehicle door can be controlled without an external apparatus by allocating the control to the key operating means 105 for the portable communication machine 100. Further, when the external apparatus 200 is utilized by way of the external apparatus communicating means 107 of the portable communication machine 100, an instruction to the vehicle control, setting to the vehicle-mounted control apparatus, and a high degree of processing or highly chromatic display for displaying data provided from the vehicle, which cannot be carried out by the key operating means 105 of the portable communication machine, can be carried out thereby. Therefore, it is not necessary to always carry a comparatively large external apparatus as in a portable communication machine integrated with an external apparatus and a portable communication machine and the external apparatus may be utilized only when needed. Further, there is not brought about a situation that a basic vehicle control cannot be carried out by consuming the battery of the external apparatus.

Figure 2:
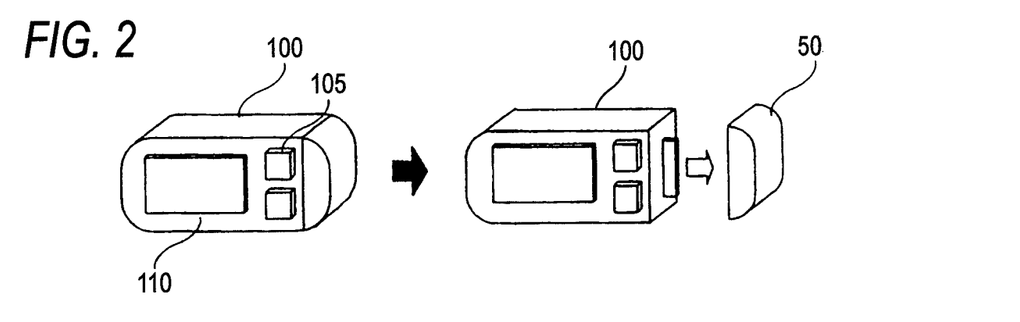
FIG. 2 is a view showing a basic constitution of removing an external apparatus communicating means of the portable communication machine according to Embodiment 1 of the invention.

Next, a specific constitution example of the portable communication machine according to the invention will be explained in reference to FIG. 2 through FIG. 6. FIG. 2 shows a perspective view of the portable communication machine 100 including the key operating means 105 and the displaying means 110 and attachably/detachably connected with external apparatus communicating means, showing a state of separating a portion of the external apparatus communicating means in using a single member of the portable communication machine. When the portion of the external apparatus communicating means is mounted, a cap 50 is detached as shown in the figure and the portion is mounted thereto in place thereof.

Figure 3:
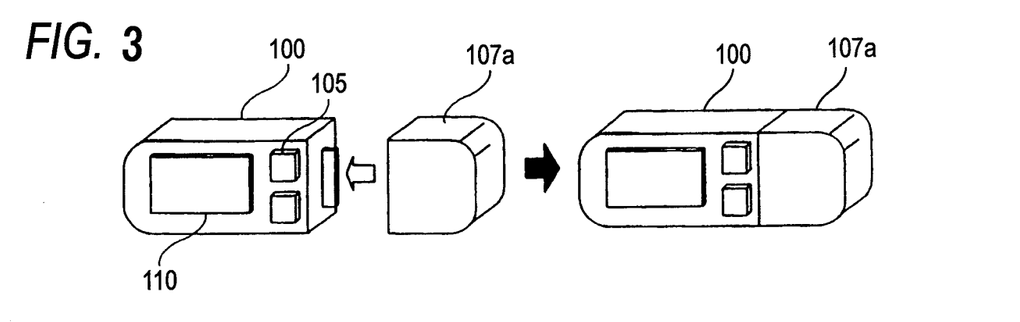
FIG. 3 is a view showing a constitution of mounting the external apparatus communicating means to the portable communication machine according to Embodiment 1 of the invention.

FIG. 3 shows a specific example of mounting external apparatus communicating means 107a using Bluetooth communication standards to the portable communication machine of FIG. 2.

Figure 4:
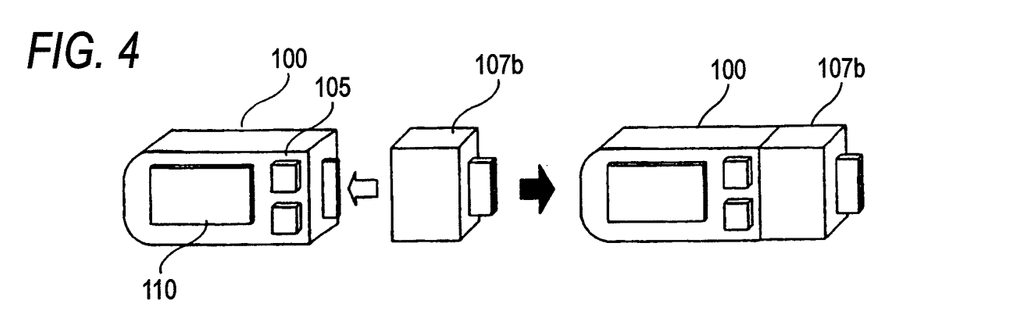
FIG. 4 is a view showing a constitution of mounting external apparatus communicating means to the portable communication machine according to Embodiment 1 of the invention.

Further, FIG. 4 shows a specific example of mounting external apparatus communicating means 107b using USB communication standards to the portable communication machine of FIG. 2. In either of the cases, the external apparatus communicating means 107a or 107b is attached to the portion of detaching the cap 50.

Figure 5:
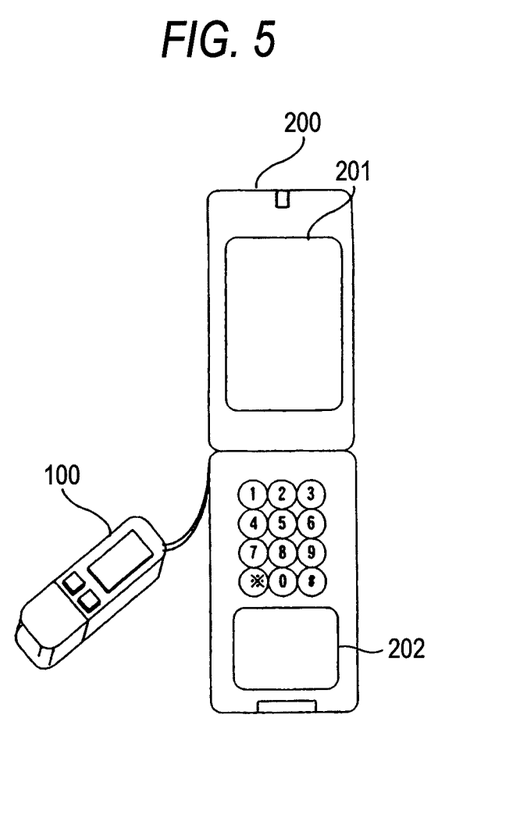
FIG. 5 is a view of constituting a vehicular communication system by the portable communication machine according to Embodiment 1 of the invention and a portable telephone.

FIG. 5 shows a specific example of a vehicular communication system when a portable telephone is utilized as the external apparatus 200 and the portable telephone and the portable communication machine 100 shown in FIG. 3 are combined.

Figure 6:
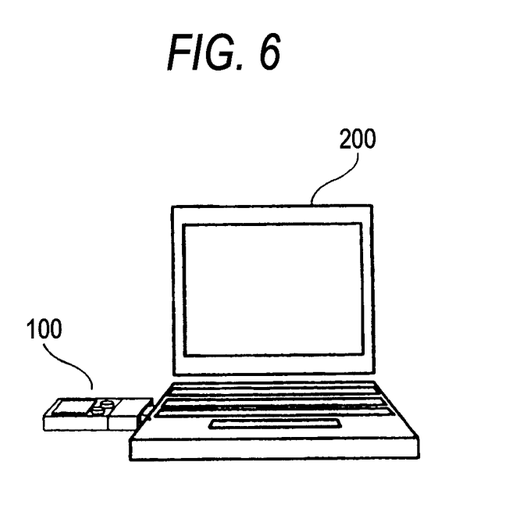
FIG. 6 is a view constituting a vehicular communication system by the portable communication machine according to Embodiment 1 of the invention and a notebook type personal computer.

FIG. 6 shows a specific example of a vehicular communication system when a notebook type personal computer is utilized as the external apparatus 200 and the portable communication machine 100 shown in FIG. 4 is connected thereto directly by USB cord.

The portable telephone and the notebook type personal computer of FIG. 5 and FIG. 6 are used for inputting a control instruction of a keyless entry and display of vehicle information. Further, in recent years, a number of the external apparatus are provided with a function of being connected to the internet. Also according to the embodiment, the external apparatus 200 is connected to the internet, searches a destination necessary for setting a car navigation apparatus therefrom and acquires position information and route information thereof. The acquired information of the destination and the route can be stored to the storing means 111 of the portable communication machine 100.

As described above, according to the vehicular communication system according to the invention, by providing the external apparatus communicating means capable of transmitting and receiving data to and from the external apparatus at the portable communication machine, existing external apparatus of a portable telephone or the like can easily be utilized as a portable terminal of the keyless entry system and the vehicle information system, or an auxiliary terminal of the vehicle-mounted information apparatus without changing hardware. Further, a keyboard of an external apparatus, a user interface having a high function of a high resolution display panel or the like, a processing capability having a high function, or an internet function can be utilized, and therefore, a vehicular communication system promoting a way of use of a user can be constructed such that a control data can easily be generated or inputted and a number of pieces of vehicular information can be displayed.

Further, although according to the portable terminal integrated with the portable communication machine and the external apparatus of the related art, when a remaining amount of a battery of the portable terminal is reduced, all of keyless operation cannot be carried out, according to the embodiment, the vehicular communication system is constituted by the portable communication machine and the external apparatus, and therefore, keyless operation can be carried out by the portable communication machine regardless of the remaining amount of the battery of the external apparatus. Further, the portion of the external apparatus communicating means is driven by the second battery, and therefore, there is achieved an effect of capable of reducing consumption of a battery necessary for keyless entry even when communication between the portable communication machine and the external apparatus is carried out.

Further, only a small-sized portable communication machine may be carried for a user using only keyless entry and the portable communication machine may be combined with the external apparatus as necessary, and therefore, portability is promoted. Further, according to the embodiment, the external apparatus communicating means is constructed by the attachable/detachable constitution by providing a general purpose input/output interface, and therefore, various external apparatus can be dealt with by only interchanging the external apparatus communicating means in accordance with various communication standards of the external apparatus and the vehicle-mounted information apparatus. Therefore, only the external apparatus communicating means may be selected in accordance with the external apparatus and the vehicle-mounted information apparatus used, and an expense for constituting the vehicular communication system can be reduced. Further, when it is not necessary to combine the external apparatus and the vehicle-mounted control apparatus, the external apparatus communicating means can be detached, and therefore, the portable communication machine becomes small-sized and is easily carried.

Further, although according to the embodiment, the external apparatus communicating means is constructed by the attachable/detachable constitution, the external apparatus communicating means may be integrated therewith, further, may be constructed by a constitution of not providing the displaying means.

Various modifications and alterations of this invention will be apparent to those skilled in the art without departing from the scope and sprint of this invention, and it should be understood that this is not limited to the illustrative embodiments set forth herein.

What is claimed is:

1. A portable communication machine comprising:
   a portable communication portion including:
      a RF data generator configured to generate a transmission data to a vehicle-mounted machine provided to a vehicle constituting an object of control by using a previously registered inherent identification data and a control data of the vehicle,
      a RF wireless transmitter configured to transmit the data generated by the RF data generator as a RF signal from an antenna to the vehicle-mounted machine,
      a RF wireless receiver configured to receive the RF signal transmitted from the vehicle-mounted machine,
      a RF data analyzer configured to analyze the data outputted by the RF wireless receiver,
      a key configured to control the vehicle by a user,
      a storing device used for storing a control data with regard to a vehicle-mounted information apparatus of the vehicle of the control object,
      a controller configured to control the RF data generator, the RF data analyzer, the key and the storing device; and
   an external communication portion including:
      an external apparatus communicating device having an interface for transmitting and receiving a data communication between an external apparatus and the portable communication portion,
      a secondary battery driving the external apparatus communicating device and the control of the vehicle's keyless operations can be carried out by the portable communication portion regardless of a remaining amount of the secondary battery of the external communicating portion; and
   wherein the portable communication portion and the external communication portion are constituted by an attachable and detachable structure.

2. The portable communication machine according to claim 1, the portable communication portion further comprising a displaying device configured to display an operation content in correspondence with the key and a result of operating to control the vehicle.

3. The portable communication machine according to claim 1, the portable communication portion further comprising a LF wireless receiver configured to receive an LF signal transmitted by the vehicle-mounted machine and LF data analyzer for analyzing a data received by the LF wireless receiver.

4. The portable communication machine according to claim 1, wherein the external apparatus communicating device is constructed by an attachable and detachable structure by constituting a boundary by a general purpose input and output interface.

5. The portable communication machine according to claim 1, wherein the external apparatus communicating device carries out the data communication between the external apparatus and the portable communication machine by a communication in conformity with UART standards.

6. The portable communication machine according to claim 1, wherein the external apparatus communicating device carries out the data communication between the external apparatus and the portable communication machine by a communication by Bluetooth standards.

7. The portable communication machine according to claim 1, wherein the external apparatus communicating device carries out the data communication between the external apparatus and the portable communication machine by a communication by infrared ray communication standards.

8. The portable communication machine according to claim 1, wherein the external apparatus communicating device carries out the data communication between the external apparatus and the portable communication machine by a communication by USB standards.

9. The portable communication machine according to claim 1, wherein the external apparatus communicating device carries out the data communication between the external apparatus and the portable communication machine by a communication by portable telephone interface communication standards.

10. A vehicular communication system which is constituted by a portable communication machine comprising:
    a portable communication portion including:
       a RF data generator configured to generate a transmission data to a vehicle-mounted machine provided at a vehicle constituting an object of control by using a previously registered inherent identification data and a control data of the vehicle,
       a RF wireless transmitter configured to transmit the data generated by the RF data generator as an RF signal from an antenna to the vehicle-mounted machine,
       a RF wireless receiver configured to receive the RF signal transmitted from the vehicle-mounted machine,
       a RF data analyzer configured to analyze the data received by the RF wireless receiver,
       a key configured to control the vehicle by a user, storing device for storing a control data with regard to a vehicle-mounted information apparatus of the vehicle constituting the control object,
a controller configured to control the RF data generator, the RF data analyzer, the key and the storing device;
an external communication portion including:
an external apparatus communicating device having an interface for transmitting and receiving a data communication and at least one secondary battery driving the external apparatus communication device and the control of the vehicle's keyless operations can be carried out by the portable communication portion regardless of a remaining amount of the secondary battery of the external communicating portion; and
an external apparatus communicating with the portable communication portion by way of the external apparatus communicating device;
wherein the external apparatus comprises user input processing device for inputting a control instruction to the vehicle and data displaying device for displaying a receiving data received from the vehicle-mounted machine; and
wherein the portable communication portion and the external communication portion are constituted by an attachable and detachable structure.

11. The vehicular communication system according to claim 10, the portable communication portion further comprising displaying device configured to display an operation content in correspondence with the key and a result of operating to control the vehicle.

12. The vehicular communication system according to claim 10, the portable communication portion further comprising LF wireless receiver configured to receive an LF signal transmitted by the vehicle-mounted machine and LF data analyzer for analyzing a data received by the LF wireless receiver.

13. The vehicular communication system according to claim 10, wherein the external apparatus communicating device is constructed by an attachable and detachable structure by constituting a boundary by a general purpose input and output interface.

14. The vehicular communication system according to claim 10, wherein the external apparatus communicating device carries out the data communication between the external apparatus and the portable communication machine by a communication in conformity with UART standards.

15. The vehicular communication system according to claim 10, wherein the external apparatus communicating device carries out the data communication between the external apparatus and the portable communication machine by a communication by Bluetooth standards.

16. The vehicular communication system according to claim 10, wherein the external apparatus communicating device carries out the data communication between the external apparatus and the portable communication machine by a communication by infrared ray communication standards.

17. The vehicular communication system according to claim 10, wherein the external apparatus communicating device carries out the data communication between the external apparatus and the portable communication machine by a communication by USB standards.

18. The vehicular communication system according to claim 10, wherein the external apparatus communicating device carries out the data communication between the external apparatus and the portable communication machine by a communication by portable telephone interface communication standards.

* * * * *